United States Patent
Ehrlich et al.

(10) Patent No.: US 9,212,904 B2
(45) Date of Patent: Dec. 15, 2015

(54) DEVICE AND METHOD FOR PASSAGE MEASUREMENT

(71) Applicant: SIEMENS AKTIENGESELLSCHAFT, Munich (DE)

(72) Inventors: Marcel Ehrlich, Berlin (DE); Tristan Sczepurek, Berlin (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 562 days.

(21) Appl. No.: 13/627,228

(22) Filed: Sep. 26, 2012

(65) Prior Publication Data
US 2013/0091930 A1 Apr. 18, 2013

(30) Foreign Application Priority Data
Oct. 13, 2011 (EP) .................................. 11185021

(51) Int. Cl.
*G01B 13/00* (2006.01)
*G01B 13/10* (2006.01)
*F01D 21/00* (2006.01)

(52) U.S. Cl.
CPC ................ *G01B 13/00* (2013.01); *G01B 13/10* (2013.01); *F01D 21/003* (2013.01); *F05D 2260/80* (2013.01); *F05D 2300/431* (2013.01)

(58) Field of Classification Search
CPC ............ B64G 1/56; G01F 1/68; G01B 13/00; G01B 13/02; G01B 13/10
USPC .......................... 606/191; 73/432, 37.5, 37.9
See application file for complete search history.

(56) References Cited

U.S. PATENT DOCUMENTS

| | | | | |
|---|---|---|---|---|
| 3,841,764 A * | 10/1974 | Snell et al. | ................. | 356/241.4 |
| 3,985,601 A * | 10/1976 | Panagrossi | .................... | 156/229 |
| 6,024,792 A | 2/2000 | Bieler | | |
| 6,487,922 B1 * | 12/2002 | Bauer et al. | .................. | 73/865.8 |
| 6,524,395 B1 | 2/2003 | Devine, II | | |
| 2004/0073249 A1 * | 4/2004 | Trotta | ........................... | 606/191 |
| 2011/0077463 A1 * | 3/2011 | Hirota | ........................... | 600/114 |
| 2011/0235672 A1 | 9/2011 | Ahmed | | |

FOREIGN PATENT DOCUMENTS

| | | |
|---|---|---|
| CN | 201271458 Y | 7/2009 |
| CN | 201880281 U | 6/2011 |
| EP | 0359660 A1 | 3/1990 |
| EP | 0486489 B1 | 11/1994 |
| EP | 0412397 B1 | 3/1998 |
| EP | 0892090 A1 | 1/1999 |
| EP | 0786017 B1 | 3/1999 |
| EP | 1221604 A2 | 7/2002 |
| EP | 1306454 A1 | 5/2003 |
| EP | 1319729 A1 | 6/2003 |
| EP | 1204776 B1 | 6/2004 |

(Continued)

*Primary Examiner* — Peter Macchiarolo
*Assistant Examiner* — Nathaniel Kolb

(57) ABSTRACT

A device for checking the passability of a through-hole of a component includes a front section and an inflatable balloon. The front section is configured so that it can be pressed into or onto the through-hole. The inflatable balloon is fluidically connected to the front section. In one embodiment, a middle section is provided, which is formed as a tube, wherein the inflatable balloon, is fluidically connected to the front section via the middle section.

8 Claims, 3 Drawing Sheets

(56) References Cited

FOREIGN PATENT DOCUMENTS

| EP | 2314987 | A1 | | 4/2011 |
|----|---------|----|---|--------|
| GB | 577921 | A | * | 5/1944 |
| GB | 2473099 | A | | 3/2011 |
| WO | WO 9967435 | A1 | | 12/1999 |
| WO | WO 0044949 | A1 | | 8/2000 |

* cited by examiner

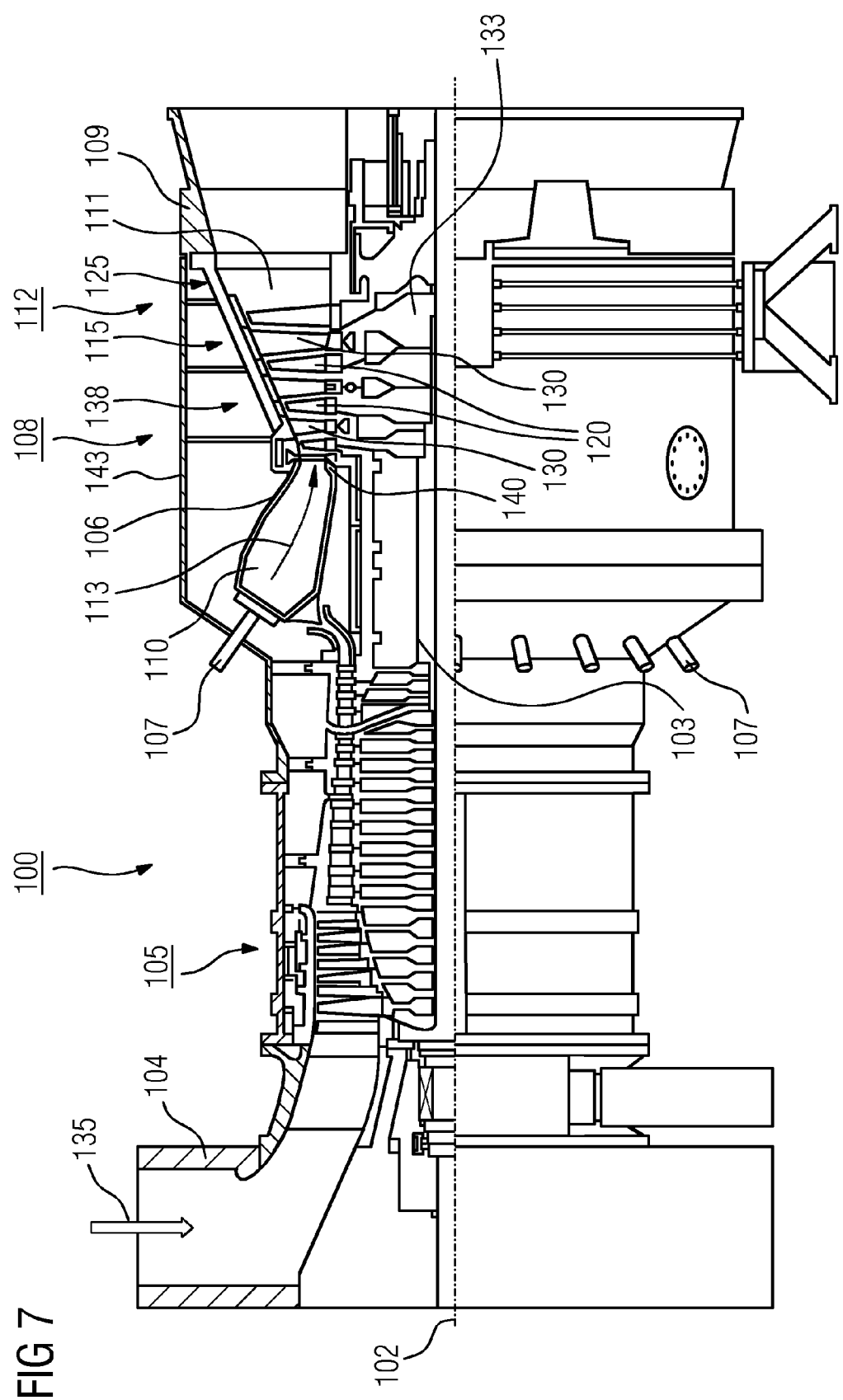

DEVICE AND METHOD FOR PASSAGE MEASUREMENT

CROSS REFERENCE TO RELATED APPLICATIONS

This application claims priority of European Patent Office application No. 11185021.0 EP filed Oct. 13, 2011. All of the applications are incorporated by reference herein in their entirety.

FIELD OF INVENTION

The illustrated embodiments refer to a device for passage measurement for the quick checking of the passability of holes, and to a method for it.

BACKGROUND OF INVENTION

High-temperature components, such as gas turbine blades, are often cooled from the inside by means of a cooling medium, wherein this discharges from the turbine blades and contributes to film cooling.

In this case, it is essential for the function and the service life of the turbine blades that the passage is not blocked since otherwise local temperature increases and breaking off of the ceramic coating system can occur during operation.

These holes can be partially closed off during operation or during reconditioning if the cooling air holes are provided in the substrate and if a subsequent coating on the cooling air hole was not completely removed. There are a number of methods for checking passability, such as infrared camera and hot air excitation, or for checking the water passability and for visually determining whether water discharges from each cooling air hole. This, however, requires costly apparatus and needs time.

In particular, the application on the plant in remote places requires a quick quality check.

SUMMARY OF INVENTION

It is an object herein to provide a means or a method with which the passability of cooling air holes can be quickly and simply checked.

The object is achieved by the features of the independent claims.

Further advantageous measures, which can be combined with each other as desired in order to achieve further advantages, are listed in the dependent claims.

DETAILED DESCRIPTION OF INVENTION

The figures and the description represent only exemplary embodiments.

Figure 1:
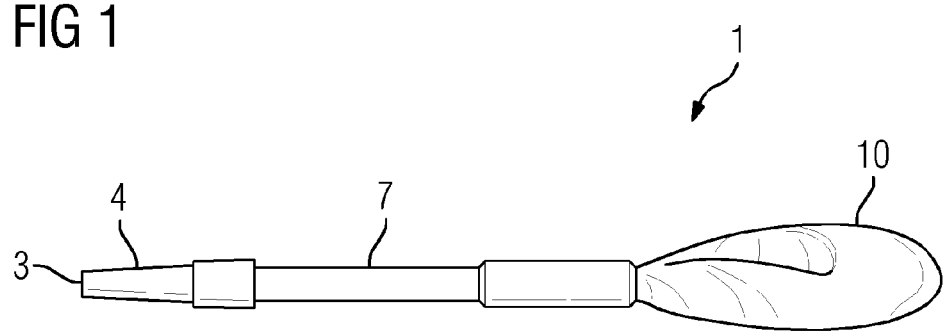
FIGS. 1-4 show exemplary embodiments,
FIG. 5 perspectively shows a turbine blade,
FIG. 6 perspectively shows a combustion chamber,
FIG. 7 perspectively shows a gas turbine.
Figure 2:
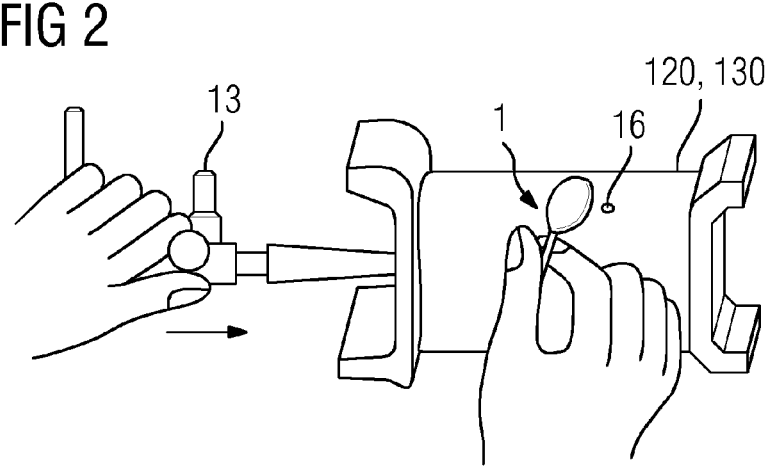

Shown in FIG. 1 is a device 1 for measuring passability of a through-hole 16 (FIG. 2).

In one embodiment, the device 1 may have three sections, these being a front section 4, which is inserted into, or seated upon, the through-hole 16, a middle section 7, as an option, for better gripping, and an inflatable balloon 10 at the end, which is connected by means of the middle section 7 to the front section 4 so that air can flow from the inlet 3 of the front section 4, through the middle section 7, into the balloon 10.

The front section 4 consists of rubber, for example, and is sufficiently elastic so that it can be inserted into the through-hole 16 and can completely close it off around the circumference or can completely cover the through-hole 16 by being seated upon it.

In one embodiment, the front section 4 is may be of an at least partially concentric construction in a way that it does not penetrate too deeply into the through-hole 16 and can exactly surround and cover difficult through-holes.

Shown in FIG. 2 is how a method is implemented using such means 1.

Compressed air 13, which is provided during each operation and available at site, is introduced into the interior of the turbine blade 120, 130 which is an exemplary component with a through-hole (a film cooling hole in this case). A corresponding adapter for the blade root or for an inlet opening of the component which is to be checked is used in this case.

The compressed air is turned on and compressed air discharges from all the through-holes 16, providing they are not closed off. The device 1 is then applied point by point or depending upon where a constriction is assumed. The device 1 can first of all be inserted into, or seated upon, a through-hole 16 and then the compressed air can be turned on.

Figure 3:
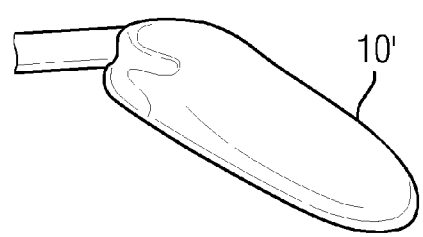

Shown in FIG. 3 is how the balloon 10 is blown up into the state 10' when air discharges from the through-hole 16 at sufficient speed. In this case, the volume is dimensioned so that it does not fill too quickly if a constriction of the through-hole 16 is present, but not too slowly so as to avoid extending the measuring time unnecessarily.

Figure 4:
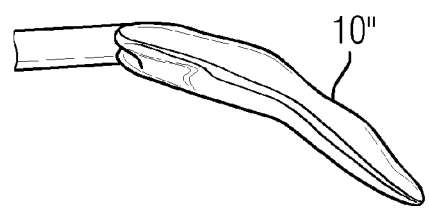

If a constriction is present in the through-hole 16, then the balloon 10 fills very slowly (state 10") or hardly at all (FIG. 4) and a visual rechecking and rectification is a specific possibility.

Figure 5:
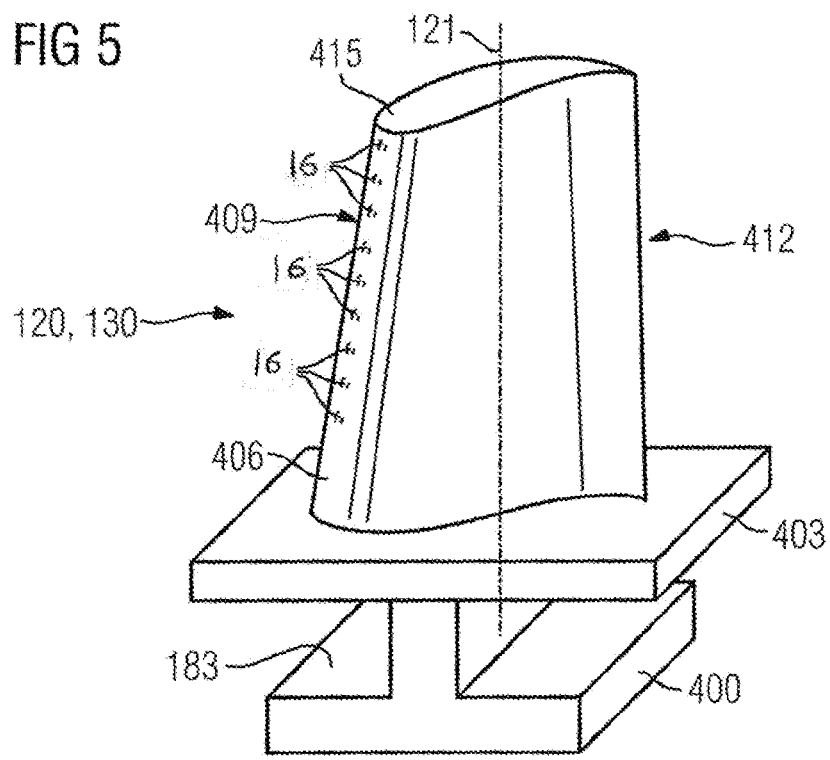

FIG. 5 shows in a perspective view a rotor blade 120 or stator blade 130 of a turbomachine, which extends along a longitudinal axis 121.

The turbomachine can be a gas turbine of an aircraft or of a power plant for electricity generation, a steam turbine or a compressor.

The blade 120, 130 has, in sequence along the longitudinal axis 121, a fastening section 400, a blade platform 403 adjoining the fastening section, and also a blade airfoil 406 and a blade tip 415.

As a stator blade 130, the blade 130 can have an additional platform (not shown) at its blade tip 415.

A blade root 183 is formed in the fastening section 400 and serves for the fastening of the rotor blades 120, 130 on a shaft or on a disk (not shown).

The blade root 183 is of inverted-T design, for example. Other designs as a fir-tree root or dovetail root are possible.

The blade 120, 130 has a leading edge 409 and a trailing edge 412 for a medium which flows past the blade airfoil 406.

In the case of conventional blades 120, 130, solid metal materials, for example, especially superalloys, are used in all the regions 400, 403, 406 of the blade 120, 130.

Such superalloys are known from EP 1 204 776 B1, EP 1 306 454, EP 1 319 729 A1, WO 99/67435 or WO 00/44949, for example.

The blade 120, 130 can be produced in this case by means of a casting process, also by means of directional solidification, by means of a forging process, by means of a milling process, or by combinations thereof.

Workpieces with a single-crystalline structure, or structures, are used as machine components which are exposed to high mechanical, thermal and/or chemical loads during operation.

The production of such single-crystalline workpieces is carried out, for example, by directional solidification of the molten metal. In this case, it involves casting processes, in which the liquid metal alloy solidifies, or directionally solidifies, to form the single-crystalline structure, i.e. the single-crystalline workpiece.

In this case, dendritic crystals are oriented along the heat flux and form either a crystalline structure of columnar grains (columnar, i.e. grains which extend over the entire length of the workpiece and here, in accordance with language customarily used, are referred to as directionally solidified), or a single-crystalline structure, i.e. the entire workpiece consists of a single crystal. In this process, the transition to the globulitic (polycrystalline) solidification must be avoided since as a result of undirectional growth transverse and longitudinal grain boundaries are inevitably formed, nullifying the good properties of the directionally solidified or single-crystalline component.

If directionally solidified structures are spoken of in general, then both single crystals, which have no grain boundaries or at most have small angle grain boundaries, and crystalline structures with columnar grains, which possibly have grain boundaries extending in the longitudinal direction but no transverse grain boundaries, are meant by this. In the case of these secondly referred to crystalline structures, directionally solidified structures are also spoken of.

Such processes are known from U.S. Pat. No. 6,024,792 and from EP 0 892 090 A1.

Also, the blades 120, 130 can have coatings against corrosion or oxidation, e.g. MCrAlX (M is at least one element of the group consisting of iron (Fe), cobalt (Co), nickel (Ni), X is an active element and stands for yttrium (Y) and/or silicon and/or at least one element of the rare earths, or hafnium (Hf)). Such alloys are known from EP 0 486 489 B1, EP 0 786 017 B1, EP 0 412 397 B1 or EP 1 306 454 A1.

In one embodiment, the density lies at 95% of the theoretic density.

On the MCrAlX layer (as an intermediate layer or as an outermost layer) a protective aluminum oxide layer (TGO=thermally grown oxide layer) is formed.

In one embodiment, the layer composition may feature Co-30 Ni-28 Cr-8 Al-0, 6 Y-0, 7 Si or Co-28 Ni-24 Cr-10 Al-0, 6 Y. In addition to these cobalt-based protective coatings, for example nickel-based protective layers, such as Ni-10 Cr-12 Al-0, 6 Y-3 Re or Ni-12 Co-21 Cr-11 Al-0, 4 Y-2 Re or Ni-25 Co-17 Cr-10 Al-0 4 Y-1, 5 Re, are also used.

Provision can additionally be made on the MCrAlX for a thermal barrier coating which may, for example, be the outermost layer and consists of ZrO2, Y2O3-ZrO2, for example, i.e. it is not stabilized, is partially stabilized or completely stabilized by yttrium oxide and/or calcium oxide and/or magnesium oxide.

The thermal barrier coating covers the entire MCrAlX layer.

By means of suitable coating processes, such as electron beam physical vapor deposition (EB-PVD), crystalline columnar grains are created in the thermal barrier coating.

Other coating processes are conceivable, e.g. atmospheric plasma spraying (APS), low-pressure plasma spraying (LPPS), vacuum plasma spraying (VPS) or chemical vapor deposition (CVD). The thermal barrier coating can have porous, microcrack- or macrocrack-affected grains for better thermal shock resistance. In one embodiment, the thermal barrier coating is therefore more porous than the MCrAlX layer.

Refurbishment means that components 120, 130 have to be freed of protective layers if necessary after their use (e.g. by means of sand-blasting). Removal of anti-corrosive and/or anti-oxidation coatings or products is then carried out. If necessary, cracks in the component 120, 130 are also repaired. After this, recoating of the component 120, 130 and re-installing of the component 120, 130 are carried out.

The blade 120, 130 can be of a hollow or solid construction. If the blade 120, 130 is to be cooled, it is hollow and, if necessary, has film cooling holes 16 (shown by dashed lines) in addition.

Figure 6:
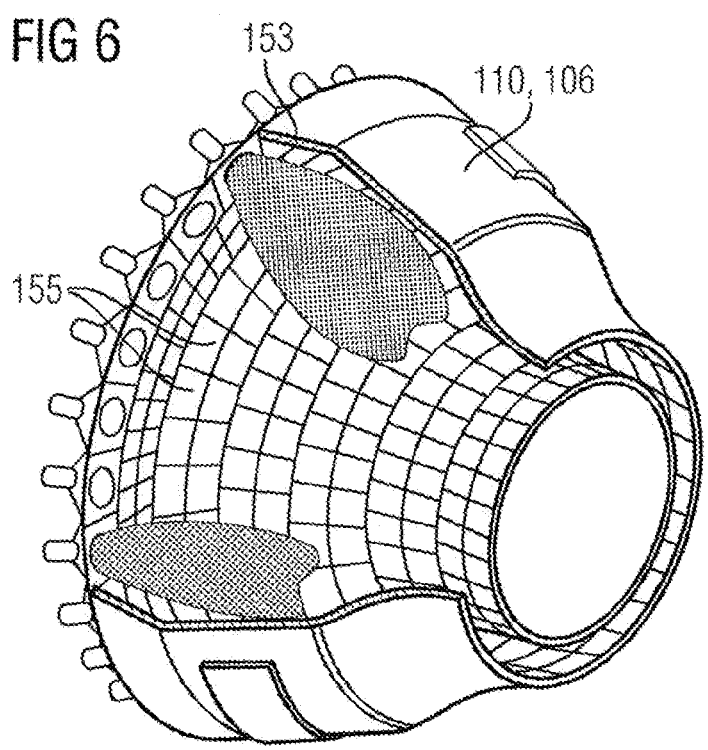

FIG. 6 shows a combustion chamber 110 of a gas turbine.

The combustion chamber 110 is designed as a so-called annular combustion chamber, for example, in which a multiplicity of burners 107, which are arranged around a rotational axis 102 in the circumferential direction, open into a common combustion chamber space 154 and create flames 156. To this end, the combustion chamber 110 is designed in its entirety as an annular structure which is positioned around the rotational axis 102.

For achieving comparatively high efficiency, the combustion chamber 110 is designed for a comparatively high temperature of the operating medium M of about 1000° C. to 1600° C. In order to also enable a comparatively long operating period in the case of these operating parameters which are unfavorable for the materials, the combustion chamber wall 153, on its side facing the operating medium M, is provided with an inner lining which is formed from heat shield elements 155.

Each heat shield element 155, consisting of an alloy, is equipped on the operating medium side with an especially heat-resistant protective layer (MCrAlX layer and/or ceramic coating) or is produced from high temperature-resistant material (solid ceramic tiles).

These protective layers can be similar to the turbine blades, that means consisting of MCrAlX, for example, wherein M is at least one element of the group consisting of iron (Fe), cobalt (Co), nickel (Ni), X is an active element and stands for yttrium (Y) and/or silicon and/or at least one element of the rare earths, or hafnium (Hf). Such alloys are known from EP 0 486 489 B1, EP 0 786 017 B1, EP 0 412 397 B1 or EP 1 306 454 A1.

Provision can additionally be made on the MCrAlX for a ceramic thermal barrier coating, for example, and consists of ZrO2, Y2O3-ZrO2, for example, i.e. it is not stabilized, is partially stabilized or completely stabilized by yttrium oxide and/or calcium oxide and/or magnesium oxide.

By means of suitable coating processes, such as electron beam physical vapor deposition (EB-PVD), crystalline columnar grains are created in the thermal barrier coating.

Other coating processes are conceivable, e.g. atmospheric plasma spraying (APS), low-pressure plasma spraying (LPPS), vacuum plasma spraying (VPS) or chemical vapor deposition (CVD). The thermal barrier coating can have porous, microcrack- or macrocrack-affected grains for better thermal shock resistance.

Refurbishment means that heat shield elements 155 have to be freed of protective coatings if necessary after their use (e.g. by means of sand-blasting). Removal of anti-corrosive and/or anti-oxidation coatings or products is then carried out. If necessary, cracks in the heat shield element 155 are also repaired. After this, recoating of the heat shield elements 155 and re-installing of the heat shield elements 155 are carried out.

On account of the high temperatures in the interior of the combustion chamber 110, a cooling system can additionally be provided for the heat shield elements 155 or for their retaining elements. The heat shield elements 155 are then hollow, for example, and, if necessary, additionally have cooling holes (not shown) which open into the combustion chamber space 154.

FIG. 7 shows by way of example a gas turbine 100 in a longitudinal partial section.

The gas turbine 100 has on the inside a rotor 103, with a shaft 101, rotatably mounted around a rotational axis 102, which is also referred to as a rotor assembly.

In series along the rotor 103 are an intake housing 104, a compressor 105, a toroidal, for example, combustion chamber 110, especially an annular combustion chamber, with a plurality of coaxially arranged burners 107, a turbine 108 and the exhaust gas housing 109.

The annular combustion chamber 110 communicates with an annular, for example, hot gas passage 111. Four turbine stages 112, for example, which are connected in series, form the turbine 108 there.

Each turbine stage 112 is formed from two blade rings, for example. A row 125 formed from rotor blades 120 follows a stator blade row 115 in the hot gas passage 111, as seen in the flow direction of an operating medium 113.

The stator blades 130 are fastened in this case on an inner housing 138 of a stator 143, whereas the rotor blades 120 of a row 125 are attached by means of a turbine disk 133, for example, on the rotor 103.

A generator or a driven machine (not shown) is coupled to the rotor 103.

During operation of the gas turbine 100, air 135 is inducted by the compressor 105 through the intake housing 104 and compressed. The compressed air which is made available at the turbine-side end of the compressor 105 is directed to the burners 107 and mixed with a combustible medium there. The mixture is then combusted in the combustion chamber 110, forming the operating medium 113. From there, the operating medium 113 flows along the hot gas passage 111, past the stator blades 130 and the rotor blades 120. The operating medium 113 expands on the rotor blades 120, transmitting an impulse, so that the rotor blades 120 drive the rotor 103 and this drives the driven machine which is coupled to it.

The components which are exposed to the hot operating medium 113 are subject to thermal loads during operation of the gas turbine 100. The stator blades 130 and rotor blades 120 of the first turbine stage 112, as seen in the flow direction of the operating medium 113, are thermally loaded most of all next to the heat shield elements which line the annular combustion chamber 110.

In order to withstand the temperatures which prevail there, these can be cooled by means of a cooling medium.

Also, substrates of the components can have a directional structure, i.e. they are single-crystalline (SX structure) or have only longitudinally-directed grains (DS structure).

As material for the components, especially for the turbine blades 120, 130 and components of the combustion chamber 110, iron-based, nickel-based or cobalt-based superalloys, for example, are used.

Such superalloys are known from EP 1 204 776 B 1, EP 1 306 454, EP 1 319 729 A1, WO 99/67435 or WO 00/44949, for example.

Also, the blades 120, 130 can have coatings against corrosion (MCrAlX, wherein M is at least one element of the group consisting of iron (Fe), cobalt (Co), nickel (Ni), X is an active element and stands for yttrium (Y) and/or silicon, scandium (Sc) and/or at least one element of the rare earths, or hafnium). Such alloys are known from EP 0 486 489 B1, EP 0 786 017 B1, EP 0 412 397 B1 or EP 1 306 454 A1.

Provision can additionally be made on the MCrAlX for a thermal barrier coating and consists of $ZrO_2$, $Y_2O_3$-$ZrO_2$, for example, i.e. it is not stabilized, is partially stabilized or completely stabilized by yttrium oxide and/or calcium oxide and/or magnesium oxide.

By means of suitable coating processes, such as electron beam physical vapor deposition (EB-PVD), crystalline columnar grains are created in the thermal barrier coating.

The stator blade 130 has a stator blade root (not shown here), which faces the inner housing 138 of the turbine 108, and a stator blade tip which lies opposite the stator blade root. The stator blade tip faces the rotor 103 and is fastened on a fastening ring 140 of the stator 143.

The invention claimed is:

1. A method for inspecting a through-hole of a gas turbine component, the method comprising:
    admitting compressed air into the interior of the gas turbine component,
    arranging an inspection device comprising a front section and an inflatable balloon fluidically connected to the front section such that the front section is pressed into or onto the through-hole, and
    checking the through-hole for any constriction by monitoring a speed of inflation of the balloon caused by the outflow of the compressed air through the through-hole of the gas turbine component.

2. The method according to claim 1, wherein the inspection device further comprises a middle section which is formed as a tube, wherein the inflatable balloon, is fluidically connected to the front section via the middle section.

3. The method according to claim 2, wherein the middle section is rigidly formed.

4. The method according to claim 2, wherein the front section, the middle section and the inflatable balloon are configured as three separate joined-together parts.

5. The method according to claim 1, wherein the front section is elastically formed.

6. The method according to claim 5, wherein the front section is formed from rubber.

7. The method according to claim 1, wherein the front section is of an at least partially concentric design.

8. The method according to claim 1, wherein the gas turbine component is a blade, and wherein the through-hole is a cooling hole.

* * * * *